No. 719,937. PATENTED FEB. 3, 1903.
B. FORD.
STORAGE BATTERY.
APPLICATION FILED DEC. 19, 1902.
NO MODEL.
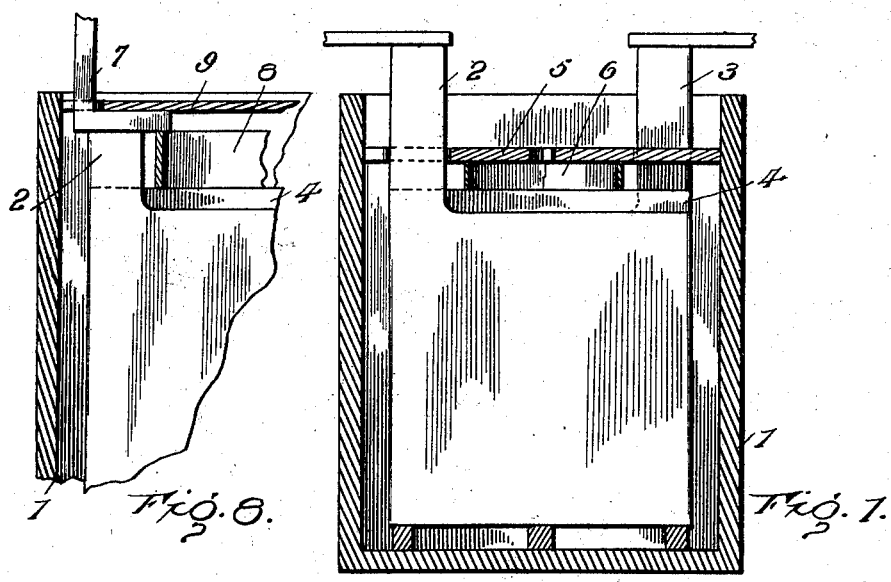
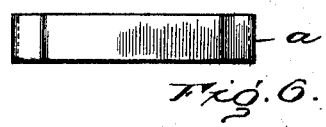
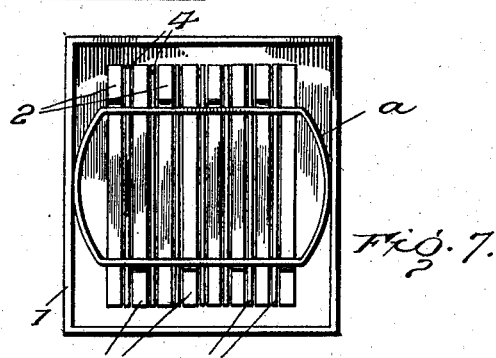
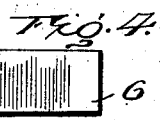
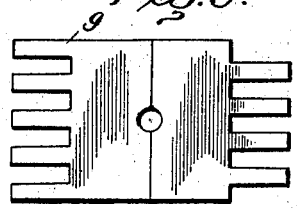
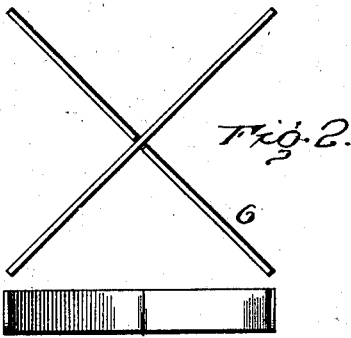
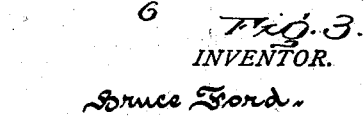
WITNESSES:
INVENTOR.
Bruce Ford.
BY
Augustus B. Stoughton
ATTORNEY.

UNITED STATES PATENT OFFICE.

BRUCE FORD, OF PHILADELPHIA, PENNSYLVANIA, ASSIGNOR TO ELECTRIC STORAGE BATTERY COMPANY, OF PHILADELPHIA, PENNSYLVANIA, A CORPORATION OF NEW JERSEY.

STORAGE BATTERY.

SPECIFICATION forming part of Letters Patent No. 719,937, dated February 3, 1903.

Application filed December 19, 1902. Serial No. 135,902. (No model.)

*To all whom it may concern:*

Be it known that I, BRUCE FORD, a citizen of the United States, residing at the city of Philadelphia, in the county of Philadelphia and State of Pennsylvania, have invented certain new and useful Improvements in Storage Batteries, of which the following is a specification.

Objects of the present invention are to provide for holding down the separators which are used between the plates or elements and which are buoyant in the electrolyte, and therefore tend to rise, and also to provide for supporting the covers in cases where suitable supports are absent.

To these and other ends hereinafter set forth the invention, stated in general terms, comprises the improvements to be finally claimed and presently described in connection with the accompanying drawings, in which—

Figure 1 is a view, principally in section, showing a cell embodying features of the invention. Fig. 2 is a top view of the holder shown in Fig. 1. Fig. 3 is a side view of the same. Fig. 4 is a detached view showing an elevation of one of the parts of the holder illustrated in Figs. 2 and 3. Figs. 5 and 6 are respectively a top and a side view of another type of holder. Fig. 7 is a top or plan view of a cell embodying a modification of the invention. Fig. 8 is a sectional view of a portion of a cell embodying a further modification of the invention, and Fig. 9 is a top or plan view of a jar-cover.

In the drawings the jar 1 contains the electrolyte and the elements 2 and 3.

4 represents separators arranged between the elements or plates, and they are of wood and are buoyant and also expansive. The separators may not be put in too tight, because if they were they would expand for a while until they were thoroughly wet, and since they must be put in loose they tend to float or rise up. Above the separators is arranged a holder, and it prevents the separators from rising and may be made also to serve as a support for the cover of the jar. The holder is intended to be properly supported for holding down the separators, and it may assume a variety of forms. As shown in Figs. 5, 6, and 7, the holder *a* is generally oblong and provided with curved parts, so that it can be sprung into place above the separators, and by pressing upon the walls of the jar remains in proper position. In such case it could be made of hard rubber. As shown in Figs. 1 and 2, the holder is in the form of a cross, and it is placed between the separators and the jar-cover 5, which is attached to the walls of the jar. As shown in Fig. 1, the holder 6 also serves to support the cover, so that it cannot slip downward. As shown in Fig. 8, the lugs 7 of the plates extend inward, so that the holder 8 can be placed under them and the jar-cover 9 can be rested upon the top of them.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In combination a cell containing an electrolyte and its complemental elements, separators buoyant in the electrolyte, and a holder arranged above the separators to prevent their rising, substantially as described.

2. In combination a cell containing an electrolyte and its complemental elements, separators expansive and buoyant in the electrolyte, and a holder arranged above the separators to prevent their rising, substantially as described.

3. In combination a cell containing an electrolyte and its complemental elements, wooden separators, and a holder arranged above the separators to prevent their rising, substantially as described.

4. In combination a cell containing an electrolyte and its complemental elements and separators, a holder arranged above the separators and elements, and a cover arranged above the holder and supported thereby, substantially as described.

In testimony whereof I have hereunto signed my name.

BRUCE FORD.

In presence of—
 H. B. HART, Jr.,
 EDGAR LONGAKER.